(12) United States Patent
Deac et al.

(10) Patent No.: US 11,990,797 B2
(45) Date of Patent: May 21, 2024

(54) ROTATING ELECTRICAL MACHINE HAVING A CIRCUIT FOR COOLING MAGNETS BY THE SHAFT

(71) Applicant: NIDEC PSA EMOTORS, Carrieres sous Poissy (FR)

(72) Inventors: Ioan Deac, Poissy (FR); Juan Wang, Vernouillet (FR); Hussain Nouri, Nanterre (FR); Guillaume Tardy, La Celle Saint Cloud (FR)

(73) Assignee: NIDEC PSA EMOTORS, Carrieres sous Poissy (FR)

( * ) Notice: Subject to any disclaimer, the term of this patent is extended or adjusted under 35 U.S.C. 154(b) by 398 days.

(21) Appl. No.: 17/423,677

(22) PCT Filed: Feb. 25, 2020

(86) PCT No.: PCT/FR2020/050366
§ 371 (c)(1),
(2) Date: Jul. 16, 2021

(87) PCT Pub. No.: WO2020/174183
PCT Pub. Date: Sep. 3, 2020

(65) Prior Publication Data
US 2022/0115926 A1    Apr. 14, 2022

(30) Foreign Application Priority Data
Feb. 28, 2019  (FR) ...................................... 1902102

(51) Int. Cl.
*H02K 1/28*    (2006.01)
*H02K 1/32*    (2006.01)
(Continued)

(52) U.S. Cl.
CPC ................. *H02K 1/32* (2013.01); *H02K 1/28* (2013.01); *H02K 5/1732* (2013.01); *H02K 7/003* (2013.01); *H02K 7/083* (2013.01); *H02K 9/19* (2013.01)

(58) Field of Classification Search
CPC .. H02K 9/16; H02K 9/19; H02K 9/18; H02K 9/197; H02K 9/20; H02K 9/06;
(Continued)

(56) References Cited

U.S. PATENT DOCUMENTS

2005/0156471 A1* 7/2005 Kobayashi ............... H02K 9/19
                                                          310/61
2010/0194220 A1  8/2010 Tatematsu et al.

FOREIGN PATENT DOCUMENTS

JP    2011097784 A    5/2011
JP    2013115848 A    6/2013
WO    2018033388 A1   2/2018

OTHER PUBLICATIONS

International Search Report for PCT/FR2020/050366 mailed Jun. 15, 2020.
Written Opinion for PCT/FR2020/050366 mailed Jun. 15, 2020.

* cited by examiner

*Primary Examiner* — Bryan R Perez
(74) *Attorney, Agent, or Firm* — Sandberg Phoenix & von Gontard P.C.

(57) ABSTRACT

The invention relates to a rotating electrical machine (1) comprising a housing (10) including two bearings (52, 53), a rotor shaft (5) mounted to rotate freely in the housing via the bearings, a rotor (6) clamped to the rotor shaft so as to rotate the rotor shaft and comprising first (62) and second (63) axial end faces, and a cooling circuit comprising a coolant supply duct (51) arranged coaxially in the rotor shaft, and a radially oriented feed duct (54) arranged in the (Continued)

rotor shaft and in fluid communication with the supply duct and the rotor, characterized in that the cooling circuit further comprises a cooling chamber (61) in fluid communication with the feed duct, extending axially between the rotor and the rotor shaft, opening onto the first and second axial end faces and delimited radially by an angular portion of an external surface (55) of the rotor shaft and an angular portion (65) of an internal surface of the rotor, the two portions extending opposite and at a distance from one another.

13 Claims, 3 Drawing Sheets

(51) Int. Cl.
*H02K 5/173* (2006.01)
*H02K 7/00* (2006.01)
*H02K 7/08* (2006.01)
*H02K 9/19* (2006.01)

(58) Field of Classification Search
CPC ............ H02K 9/14; H02K 1/193; H02K 1/32; H02K 1/20; H02K 5/20; H02K 5/02; H02K 5/04; H02K 5/08; H02K 41/031
See application file for complete search history.

[Fig.1]
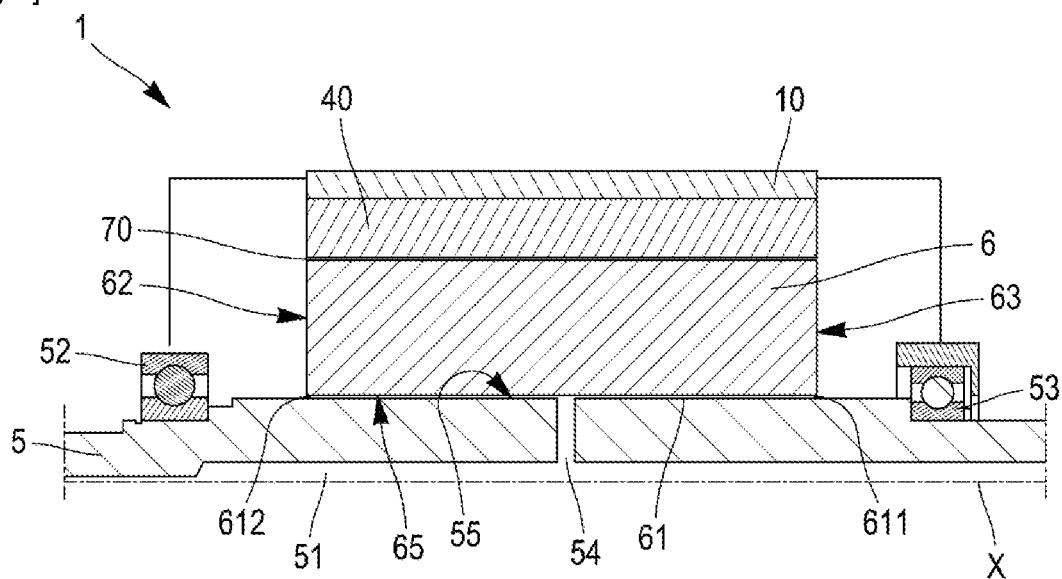
[Fig.2]
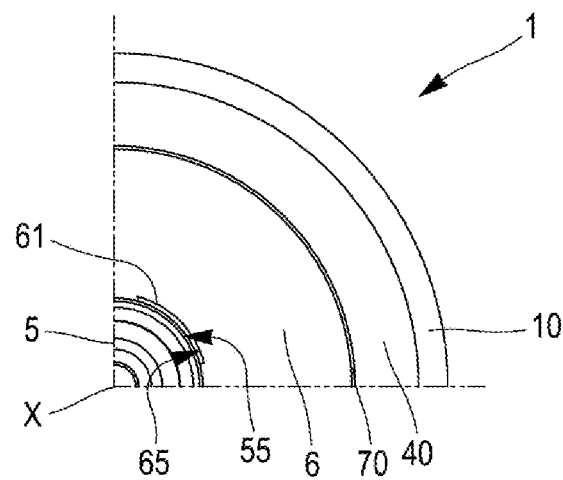

[Fig.3]
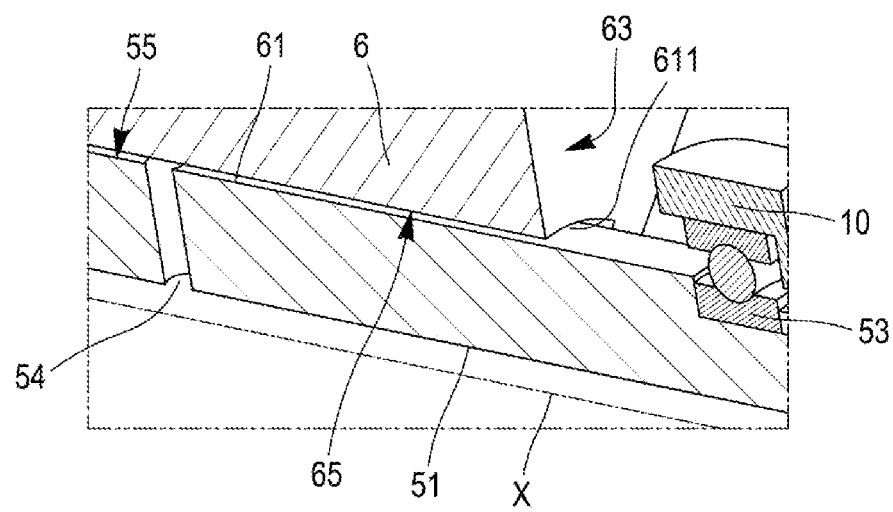
[Fig.4]
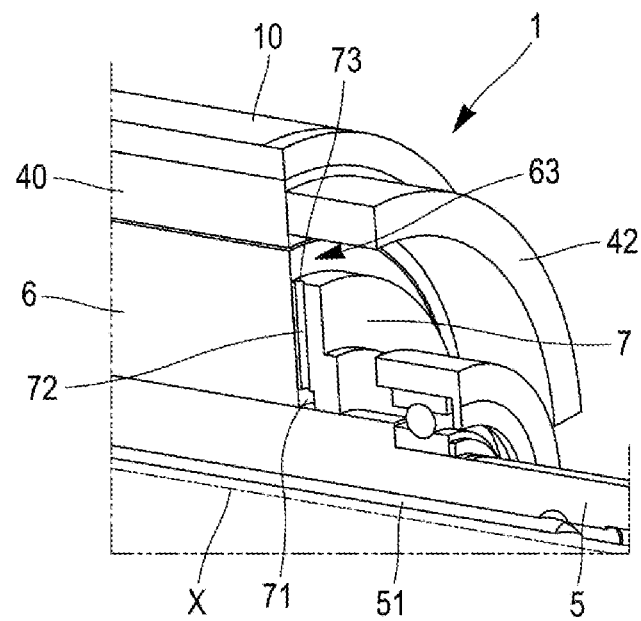

[Fig.5]
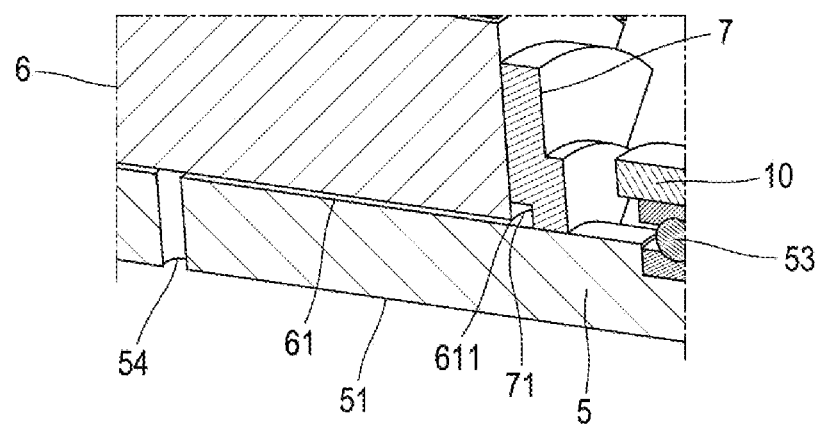
[Fig.6]
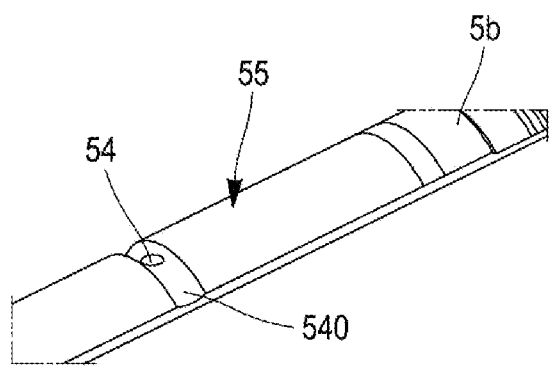

ROTATING ELECTRICAL MACHINE HAVING A CIRCUIT FOR COOLING MAGNETS BY THE SHAFT

CROSS-REFERENCE TO RELATED APPLICATIONS

This application is the US National Stage under 35 USC § 371 of International Application PCT/FR2020/050366 filed 25 Feb. 2020 which claims priority to French application 1902102 filed on Feb. 28, 2019, the content of which (text, drawings and claims) is incorporated here by reference.

BACKGROUND

The invention relates to a rotating electrical machine of the type comprising a rotor shaft cooling circuit.

STATE OF THE ART

Currently, a rotating electrical machine, such as a high-power electric motor for moving a motor vehicle, requires means for cooling its various component parts and in particular the rotor, which generally comprises so-called permanent magnets, which, beyond a certain temperature, become irreversibly non-magnetic. Many solutions for cooling the rotor have been proposed. For example, US 2010/0194220, discloses an electric motor in which the circulation of the cooling circuit is effected by a hollow rotor shaft, then axially by the rotor clamping flanges supplied by axial ducts in the rotor shaft; the rotor cooling taking place only along the axial end faces of the rotor and a little through the rotor shaft. The rotor cooling is not efficient.

US 2005/0156471 discloses an electric motor in which the circulation of the cooling circuit is effected by a hollow rotor shaft, then axially in an annular space created between the hollow shaft and a second tubular shaft, interconnected on the hollow shaft and on which the rotor is clamped. On leaving the annular space, the coolant slides along the axial end faces of the rotor. The cooling circuit is complex without being more efficient because of the thermal resistance between the second tubular shaft and the rotor.

SUMMARY

An object of the invention is to provide a rotating electrical machine comprising a shaft cooling circuit which is simple and efficient without having the above drawbacks.

To this end, there is provided a rotating electrical machine comprising a housing comprising two bearings, a rotor shaft mounted to rotate freely in the housing via the bearings, a rotor mounted to the rotor shaft so as to rotate the rotor shaft and comprising first and second axial end faces, and a cooling circuit comprising a coolant supply duct arranged coaxially in the rotor shaft, and a radially oriented feed duct arranged in the rotor shaft and in fluid communication with the supply duct and the rotor, wherein the cooling circuit further comprises a cooling chamber in fluid communication with the feed duct, the cooling chamber extending axially between the rotor and the rotor shaft which opens onto the first and second axial end faces and is delimited radially by an angular portion of an external surface of the rotor shaft and an angular portion of an internal surface of the rotor, the two portions extending opposite and at a distance from one another.

Advantageously, but optionally, the rotating electrical machine has at least one of the following technical features:
- the angular portion of the internal surface of the rotor is a cavity extending axially from the first and second axial end faces;
- the angular portion of the external surface of the rotor shaft is a cavity extending axially over at least one axial length of the rotor;
- the machine comprises a rotor clamping flange mounted on the rotor shaft, bearing on one of the first and second axial end faces, and comprising a projection orifice on a radially outer periphery in fluid communication with the cooling chamber;
- the machine comprises a second rotor clamping flange mounted on the rotor shaft, bearing on the other of the first and second axial end faces, and comprising a projection orifice on a radially outer periphery in fluid communication with the cooling chamber;
- the clamping flanges comprise an annular collection groove into which the cooling chamber axially opens;
- the projection orifice is in fluid communication with the annular collection groove;
- the projection orifice is fluidly connected with the annular collection groove via a channel extending radially in a thickness of the clamping flange considered;
- the projection orifice is oriented so as to project a coolant onto the coil heads of a stator surrounding the rotor during operation of the machine;
- the feed duct opens into an annular groove formed on a radially outer circumference of the external surface of the rotor shaft; and
- the rotor is an axial stack of rotor plates.

BRIEF DESCRIPTION OF THE FIGURES

Other features and advantages of the claimed invention will become apparent upon reading the following description. In the accompanying drawings:

FIG. 1 is a schematic half-sectional view of a rotating electrical machine;

FIG. 2 is a quarter-sectional view of the machine of FIG. 1;

FIG. 3 is a three-dimensional detail view in section illustrating the arrangement of the rotor of the machine of FIG. 1;

FIGS. 4 and 5 are three-dimensional detail views in section according to two different angular sections illustrating the arrangement of the rotor according to a variant embodiment of the machine of FIG. 1; and FIG. 6 is a detail view of a variant embodiment of the rotor shaft of the machine of FIG. 1.

DETAILED DESCRIPTION OF AN EMBODIMENT

With reference to FIGS. 1 to 3, we will describe an embodiment of a rotating electrical machine 1.

The rotating electrical machine 1 comprises a housing 10. The rotating electrical machine 1 further comprises, provided within the housing 10, a rotor 6 mounted fixedly on a rotor shaft 5 of longitudinal axis X. The rotor shaft 5 is held in the housing 10, free to rotate, by bearings 52, 53 in the housing 10.

Furthermore, the rotating electrical machine 1 comprises a stator fixedly mounted in the housing 10 so as to completely surround the rotor 5. Here, the stator comprises a stator body 40 and a coil received longitudinally in the stator body 40 and having winding heads 42 (FIG. 4) projecting longitudinally on either side of the stator body 40. The winding head is visible in FIG. 4 only. An air gap 70 is present between the rotor 6 and the stator body 40.

The rotor 6 may be a single piece or an axial stack of rotor plates. Stacking is a preferred solution in the production of the rotating electrical machine 1. The rotor 6 comprises first 62 and second 63 axial end faces. The rotor 6 is mounted on the rotor shaft 5 in a manner known per se. The rotor 6 further comprises an internal surface which is in clamping contact with the rotor shaft 5, when mounted on the rotor shaft 5. At this internal surface; the rotor 6 comprises an angular portion 65 of this internal surface which defines a cavity extending axially from the first 62 and second 63 axial end faces.

The rotor shaft 5 in turn comprises a supply duct 51 which is formed in the rotor shaft 5 in a manner coaxial with the rotor shaft. Thus, the rotor shaft 5 is a hollow shaft. The rotor shaft 5 further comprises at least one radially oriented feed duct 54 which passes through a diameter of the rotor shaft 5. Thus, the feed duct 54 extends from the supply duct 51 to an external surface 55 of the rotor shaft 5. The feed duct 54 is positioned so as to be midway between the first 62 and second 63 axial end faces of the rotor 6, when the rotor 6 is mounted on the rotor shaft 5.

Once the rotor 6 is clamped on the rotor shaft 5, the angular portion 65 of the internal surface having the aforementioned cavity of the rotor 5 then extends opposite and at a distance from an angular portion of the external surface 55 of rotor shaft 5. This makes it possible to radially delimit a cooling chamber 61 which then extends axially between the rotor 6 and the rotor shaft 5, and which opens onto the first 62 and second 63 axial end faces of the rotor 6, by outlet orifices 612 and 611, respectively. It should be noted that the rotor 6 is positioned on the rotor shaft 5 such that the feed duct 54 opens into the cooling chamber 61. Thus, the feed duct 54 is in fluid communication with the supply duct 51 on the one hand and, on the other hand, with the cooling chamber 61, and therefore more generally with the rotor 6.

It is apparent from the foregoing that the rotating electrical machine 1 which has just been described comprises a cooling circuit comprising the supply duct 51, the feed duct 54, and the cooling chamber 61. The coolant therefore enters via the supply duct 51 to exit via the orifices 611, 612 after having been in direct contact with the rotor 6 over its entire axial length. Once the coolant has exited through the orifices 611, 612, due to the centrifugal forces caused by the rotation of the rotor 6 about the longitudinal axis X, all or part of the coolant travels along the first 62 and second 63 axial end faces of the rotor and is then projected onto the winding heads 42 to cool them in turn.

According to a variant embodiment of the cooling chamber 61, the cavity forming the angular portion 65 of the internal surface of the rotor 6 is produced, instead, on the rotor shaft 5 and then forms the angular portion of the external surface of the above rotor shaft. According to another variant embodiment of the chamber 61, the aforementioned cavities are made both on the rotor shaft 5 and on the rotor 6 as previously described, then placed opposite one another during assembly.

With reference to FIG. 6, we will briefly describe a variant embodiment of the rotor shaft 5b. The rotor shaft 5b comprises an annular groove 540 which goes around a circumference of the external surface 55. The feed duct 54 opens into a bottom of the annular groove 540. The presence of such an annular groove 540 makes it possible to simplify the angular positioning of the rotor 6, and therefore of the cooling chamber 61, which will always be in fluid communication with the feed duct 54 via the annular groove 540.

With reference to FIGS. 4 and 5, we will describe a variant embodiment of the rotating electrical machine 1 which has just been described. According to this variant embodiment, the rotating electrical machine 1 further comprises a clamping flange 7 clamped on the rotor shaft. Here illustrated in the figures, the clamping flange 7 has the general shape of a washer. During assembly of the rotating electrical machine 1, the clamping flange 7 comes into clamping engagement with the second end face 63 of the rotor 6. It should be noted that a second clamping flange 7 is also positioned in the same manner in clamping engagement with the first axial end face 62.

The clamping flange 7 comprises a projection orifice 73 on a radially outer periphery thereof which in fluid communication with the cooling chamber 61, when the clamping flange 7 is mounted to the rotor shaft. To achieve this fluid communication; the clamping flange 7 comprises a channel 72 extending radially in a thickness of the clamping flange, the channel 72 terminating in the projection orifice 73. In addition, the channel 72 is fluidly connected with the cooling chamber 61. To this end, the clamping flange 7 comprises an annular collection groove 71 into which the cooling chamber opens axially, the orifices 611, 612 respectively, being open in the annular collection groove 71. The channel 72 also opens into the annular collection groove 71. The projection orifice 73 is oriented so as to project a coolant onto the winding heads 42 of the stator surrounding the rotor 6 in order to cool the winding heads during operation of the rotating electrical machine 1.

The rotating electrical machine 1 which has just been described makes it possible to produce a cooling circuit for the rotor 6 by direct contact of the coolant on a portion 65 of the internal surface of said rotor 6, so as to capture the heat to be optimally removed from the rotor 6 and thus to protect the permanent magnets of the rotor 6. This capture is all the more effective when the rotor 6 is a longitudinal stack of rotor plates because the coolant is in contact with the elements of the stack along the edge of the stack, these elements having better thermal conductivity in the radial direction than in a longitudinal direction.

The rotating electrical machine 1 which has just been described can be a synchronous or asynchronous machine. It is in particular a machine for traction or propulsion of electric motor vehicles (Battery Electric Vehicle) and/or hybrid motor vehicles (Hybrid Electric Vehicle—Plug-in Hybrid Electric Vehicle), such as passenger cars, vans, trucks, buses or coaches. The rotating electrical machine 1 can also be used in industrial and/or energy production applications, such as wind turbines, boats or submarines.

Of course, it is possible to make numerous modifications to the claimed invention without departing from the scope thereof.

The invention claimed is:

1. A rotating electrical machine comprises:
   a housing comprising two bearings, a rotor shaft mounted to rotate freely in the housing via the bearings, a rotor mounted to the rotor shaft so as to rotate the rotor shaft and comprising first and second axial end faces, and a cooling circuit comprising a coolant supply duct arranged coaxially in the rotor shaft and a radially oriented feed duct arranged in the rotor shaft and in fluid communication with the supply duct and the rotor,
   wherein the cooling circuit further comprises a cooling chamber in fluid communication with the feed duct, the cooling chamber extending axially between the rotor and the rotor shaft, the cooling chamber opening onto the first and second axial end faces of the rotor and being delimited radially by an angular portion of an external surface of the rotor shaft and an angular portion of an internal surface of the rotor, the two angular portions extending opposite and at a distance from one another, and wherein the feed duct opens into an annular groove arranged on a radially outer circumference of the external surface of the rotor shaft.

2. The machine according to claim 1, wherein the angular portion of the internal surface of the rotor is a cavity extending axially from the first and second axial end faces.

3. The machine according to claim 1, wherein the angular portion of the external surface of the rotor shaft is a cavity extending axially over at least one axial length of the rotor.

4. The machine according to claim 1, wherein the rotor comprises an axial stack of rotor plates.

5. The machine according to claim 1, further comprising a rotor clamping flange mounted on the rotor shaft, bearing on one of the first and second axial end faces, and comprising a projection orifice on a radially outer periphery of the clamping flange which is in fluid communication with the cooling chamber via a channel.

6. The machine according to claim 5, further comprising a second rotor clamping flange mounted on the rotor shaft, bearing on the other of the first and second axial end faces, and comprising a second projection orifice on a radially outer periphery of the second clamping flange which is in fluid communication with the cooling chamber via a second channel.

7. The machine according to claim 5, wherein the clamping flange comprises an annular collection groove into which the cooling chamber axially opens.

8. The machine according to claim 7, wherein the projection orifice is in fluid communication with the annular collection groove.

9. The machine according to claim 8, wherein the projection orifice is fluidly connected with the annular collection groove via the channel extending radially in a thickness of the clamping flange considered.

10. The machine according to claim 5, wherein the projection orifice is oriented so as to project a coolant onto winding heads of a stator surrounding the rotor during operation of the machine.

11. A rotating electrical machine comprises:

a housing comprising two bearings, a rotor shaft mounted to rotate freely in the housing via the bearings, a rotor mounted to the rotor shaft so as to rotate the rotor shaft and comprising first and second axial end faces, and a cooling circuit comprising a coolant supply duct arranged coaxially in the rotor shaft and a radially oriented feed duct arranged in the rotor shaft and in fluid communication with the supply duct and the rotor, wherein the cooling circuit further comprises a cooling chamber in fluid communication with the feed duct, the cooling chamber extending axially between the rotor and the rotor shaft, the cooling chamber opening onto the first and second axial end faces of the rotor and being delimited radially by an angular portion of an external surface of the rotor shaft and an angular portion of an internal surface of the rotor, the two angular portions extending opposite and at a distance from one another, wherein, the angular portion of the external surface of the rotor shaft is a cavity extending axially over at least one axial length of the rotor, and wherein the machine comprises a clamping flange mounted on the rotor shaft and bearing on one of the first and second axial end faces of the rotor, the machine comprising a projection orifice on a radially outer periphery of the clamping flange which is in fluid communication with the cooling chamber via a radially extending channel.

12. The machine according to claim 2 wherein the angular portion of the internal surface of the rotor is a cavity extending axially from the first and second axial end faces.

13. The machine according to claim 2, wherein the rotor comprises an axial stack of rotor plates.

* * * * *